O. E. HAGLUND.
ATTACHMENT FOR PROPELLING AUTOMOBILES IN SNOW.
APPLICATION FILED FEB. 12, 1917.
1,264,389.
Patented Apr. 30, 1918.
2 SHEETS—SHEET 1.
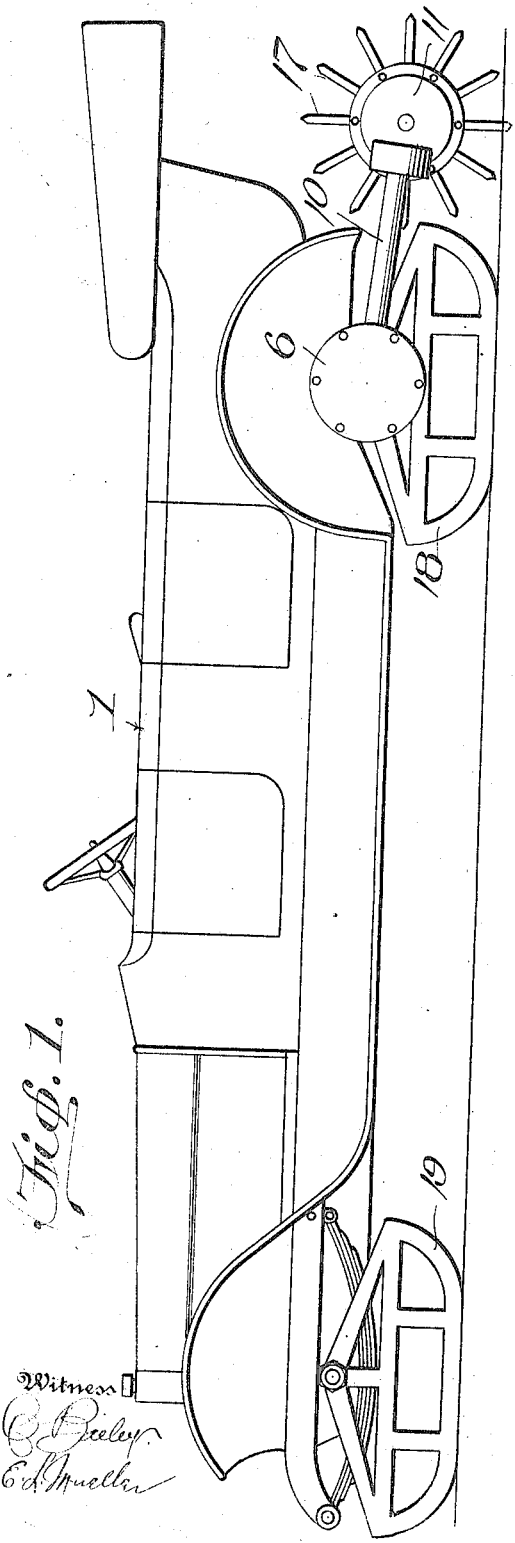
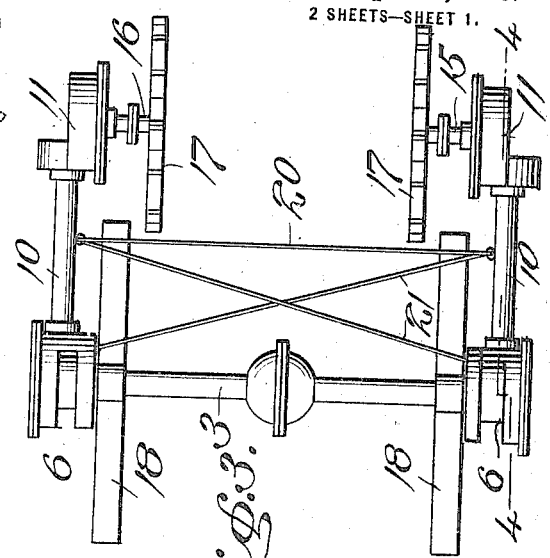
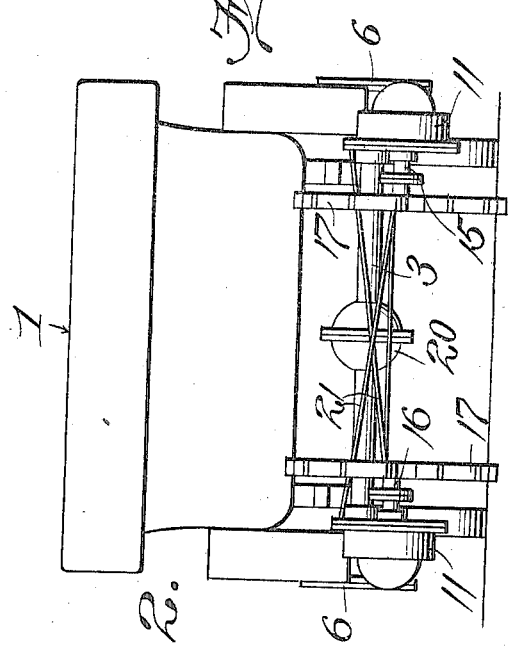
Inventor
O. E. Haglund O. E. HAGLUND.
ATTACHMENT FOR PROPELLING AUTOMOBILES IN SNOW.
APPLICATION FILED FEB. 12, 1917.
1,264,389.
Patented Apr. 30, 1918.
2 SHEETS—SHEET 2.
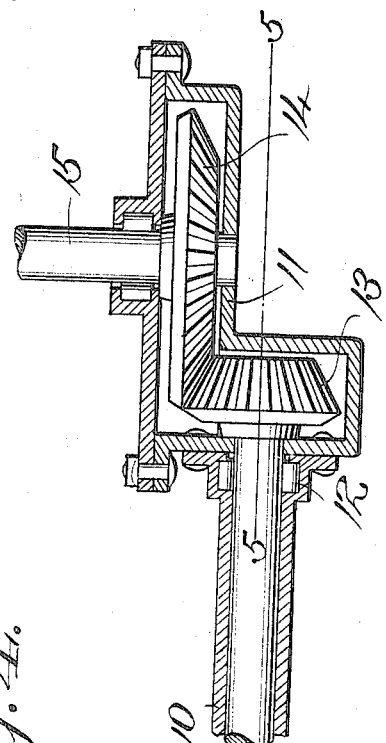
Fig. 4.
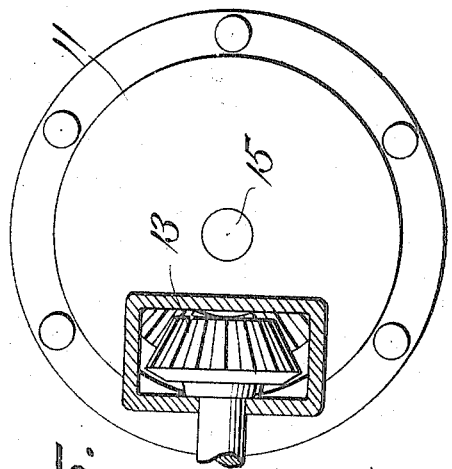
Fig. 5.
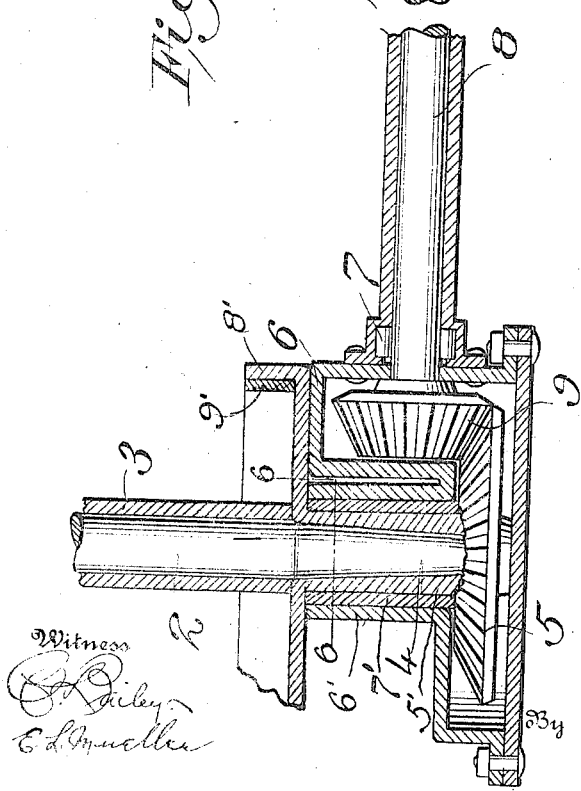
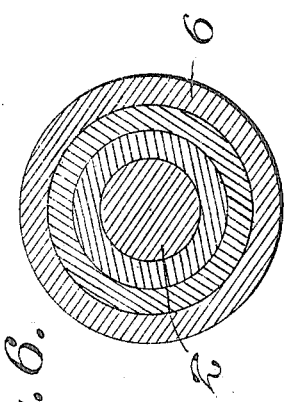
Fig. 6.
Inventor
O. E. Haglund,

UNITED STATES PATENT OFFICE.

OTTO E. HAGLUND, OF DODSON, MONTANA.

ATTACHMENT FOR PROPELLING AUTOMOBILES IN SNOW.

1,264,389.  Specification of Letters Patent.  Patented Apr. 30, 1918.

Application filed February 12, 1917. Serial No. 148,071.

*To all whom it may concern:*

Be it known that I, OTTO E. HAGLUND, a citizen of the United States, residing at Dodson, in the county of Blaine, State of Montana, have invented certain new and useful Improvements in Attachments for Propelling Automobiles in Snow; and I do hereby declare the following to be a full, clear, and exact description of the invention, such as will enable others skilled in the art to which it appertains to make and use the same.

The present invention is directed to improvements in devices adapted to be attached to automobiles to propel the same when snow is on the ground, and has for its object to provide a device of this character which can be easily connected with the drive axles of an automobile upon removing the rear wheels therefrom, and when in place will serve to propel the vehicle over the snow.

A further object of the invention is to provide a device of this character which when connected with the automobile can swing upwardly and downwardly for movement over uneven surfaces.

With these and other objects in view, this invention resides in the novel features of construction, formation, combination and arrangement of parts to be hereinafter more fully described, claimed and illustrated in the accompanying drawing, in which:—

Figure 1 is a side elevation of an automobile equipped with the device.

Fig. 2 is a rear view.

Fig. 3 is a fragmentary top plan view.

Fig. 4 is a sectional view on line 4—4 of Fig. 3.

Fig. 5 is a sectional view on line 5—5 of Fig. 4.

Fig. 6 is a sectional view on line 6—6 of Fig. 4.

Referring to the drawing 1 indicates the automobile, which may be of any conventional make, and 2 the rear driving axles thereof, said axles being incased in the usual sleeves 3.

To apply the attachment the wheels are removed from the spindles 4, and beveled gears 5 secured to said spindles. The spindles 4 and gears 5 are inclosed in the casings 6 each of which is bent to provide a sleeve portion 6' which surrounds a bearing 7' that, in turn, surrounds the extension 5' of the gear 5 which extension receives the spindle 4. The extension 5' terminates in a brake member 8' with which is associated and conventionally shown at 9' an expansible brake element operated in any suitable manner to engage the inner periphery of the brake member 8'.

Each casing is provided with bearings 7 for rotatably supporting the forward ends of the shafts 8, said shafts having fixed to their inner ends bevel gears 9 which are adapted to mesh with the gears 5. The shafts 8 are inclosed in the sleeves 10, having their forward ends engaged with the casings 6. Casings 11 are connected to the rear ends of the sleeves 10 and are provided with bearings 12 which are engaged by the rear ends of the shafts 8, said rear ends having fixed thereto bevel gears 13 which are adapted to mesh with the bevel gears 14.

Journaled transversely of the casings 11 are shafts 15 which support the gears 14, and which have fixed to their inner ends shafts 16, said shafts having secured to their inner ends propelling wheels 17 which are adapted to engage in the snow so that when rotary movement is imparted thereto the vehicle will be propelled.

Runners 18 are connected with the sleeves 3 so as to support the rear end of the automobile after the usual wheels have been removed, and if desired the runners 19 can be connected with the front axles of the machine upon removal of the usual front wheels. The casings 11 are braced by the rod 20, said casing being also connected by the diagonal brace rods 21, which have their forward ends connected to the casings 6.

From the foregoing description it will be seen that the rear axles 2 of the automobile can be operated in the usual manner, and since the gears 5 are connected to the spindles 4 it is obvious that rotary movement will be imparted to the shafts 8, and through the medium of the gears 13 and 14 rotary movement will be imparted to the shafts 15 and 16, and thus to the propelling wheel 17.

It will be of course understood that the casings 6 are connected to the sleeves 3 so that the same can partially rotate, thereby permitting the shafts 8 to swing upwardly and downwardly when traveling over uneven surfaces.

What is claimed is:—

The combination of a rear axle of a motor vehicle, a casing supported at each end of said axle and having a portion surrounding said end, a gear inclosed in each casing and having an extension surrounded by said portion and receiving said axle, a second casing associated with each of the first named casings and having a gear inclosed therein, a shaft journaled in each of the second named casings, a propelling wheel carried by each shaft, and a shaft extending between each of the first named casings and the adjacent second named casing and having gears inclosed in the respective casings and engaging the gear therein for transmitting power from said rear axle to said propelling wheels.

In testimony whereof I affix my signature in the presence of two witnesses.

OTTO E. HAGLUND.

Witnesses:
H. F. BERLINKE,
ALBERT N. HAGLUND.

Copies of this patent may be obtained for five cents each, by addressing the "Commissioner of Patents, Washington, D. C."